United States Patent [19]
Kusunose

[11] Patent Number: 6,043,932
[45] Date of Patent: Mar. 28, 2000

[54] LASER MICROSCOPE AND A PATTERN INSPECTION APPARATUS USING SUCH LASER MICROSCOPE

[75] Inventor: Haruhiko Kusunose, Yokohama, Japan

[73] Assignee: Lasertec Corporation, Yokohama, Japan

[21] Appl. No.: 09/053,679

[22] Filed: Apr. 2, 1998

[30] Foreign Application Priority Data

Apr. 7, 1997 [JP] Japan ................................ 9-088116

[51] Int. Cl.[7] .................................................. G02B 21/00
[52] U.S. Cl. .......................... 359/368; 359/389; 359/393
[58] Field of Search .................................... 359/368, 385, 359/389, 393; 250/201.3

[56] References Cited

U.S. PATENT DOCUMENTS

| | | | |
|---|---|---|---|
| 4,072,395 | 2/1978 | Mohon | 359/19 |
| 4,736,110 | 4/1988 | Awamura | 250/201.4 |
| 5,035,476 | 7/1991 | Ellis et al. | 359/202 |
| 5,587,832 | 12/1996 | Krause | 359/835 |
| 5,673,144 | 9/1997 | Chastang et al. | 359/385 |
| 5,774,222 | 6/1998 | Maeda et al. | 356/394 |
| 5,804,813 | 9/1998 | Wang et al. | 250/201.3 |

*Primary Examiner*—Cassandra Spyrou
*Assistant Examiner*—Mark A. Robinson
*Attorney, Agent, or Firm*—Oliff & Berridge, PLC

[57] ABSTRACT

A laser microscope for picking up an image of a specimen at a high speed and a pattern checking apparatus for checking a pattern at a high speed with a high sensitivity can be provided. A plurality of light beams aligned in a first direction are produced from a light source device (1, 10), and these light beams are projected onto a specimen (7, 30) by an objective lens (6, 29) to form a light spot array on the specimen. The specimen is moved in a direction perpendicular to the light spot array or the light beams are moved by a beam deflecting device in said direction to scan the specimen two-dimensionally. Light beams emanating from the light spots on the specimen are made incident upon corresponding light receiving elements of a linear image sensor (11, 33). In case of checking periodic patterns such as memory cell patterns, a pitch of the light spots is corresponded to a pitch of the patterns, and defects in the patterns can be detected by comparing output signals from respective light receiving elements.

6 Claims, 9 Drawing Sheets

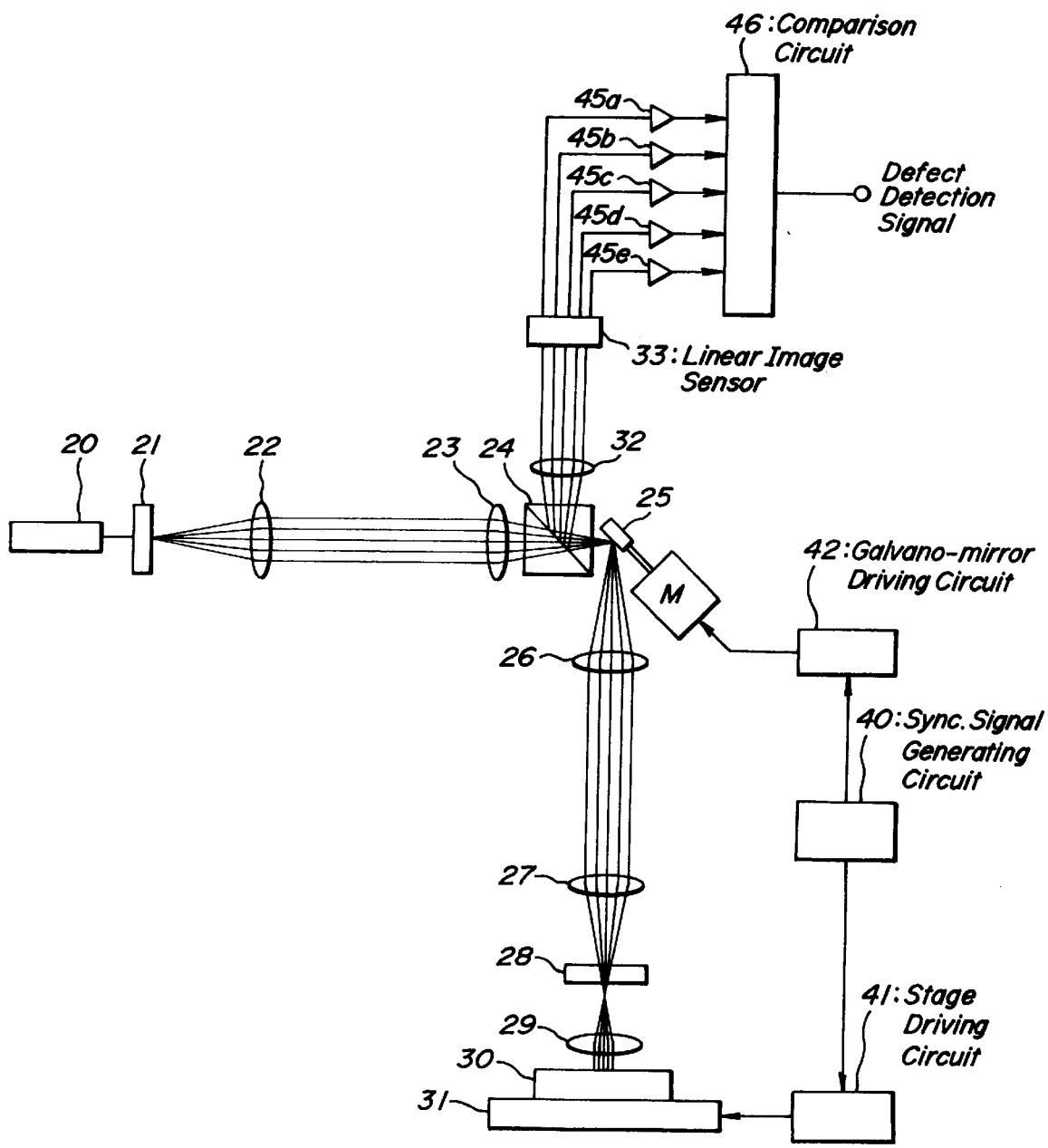

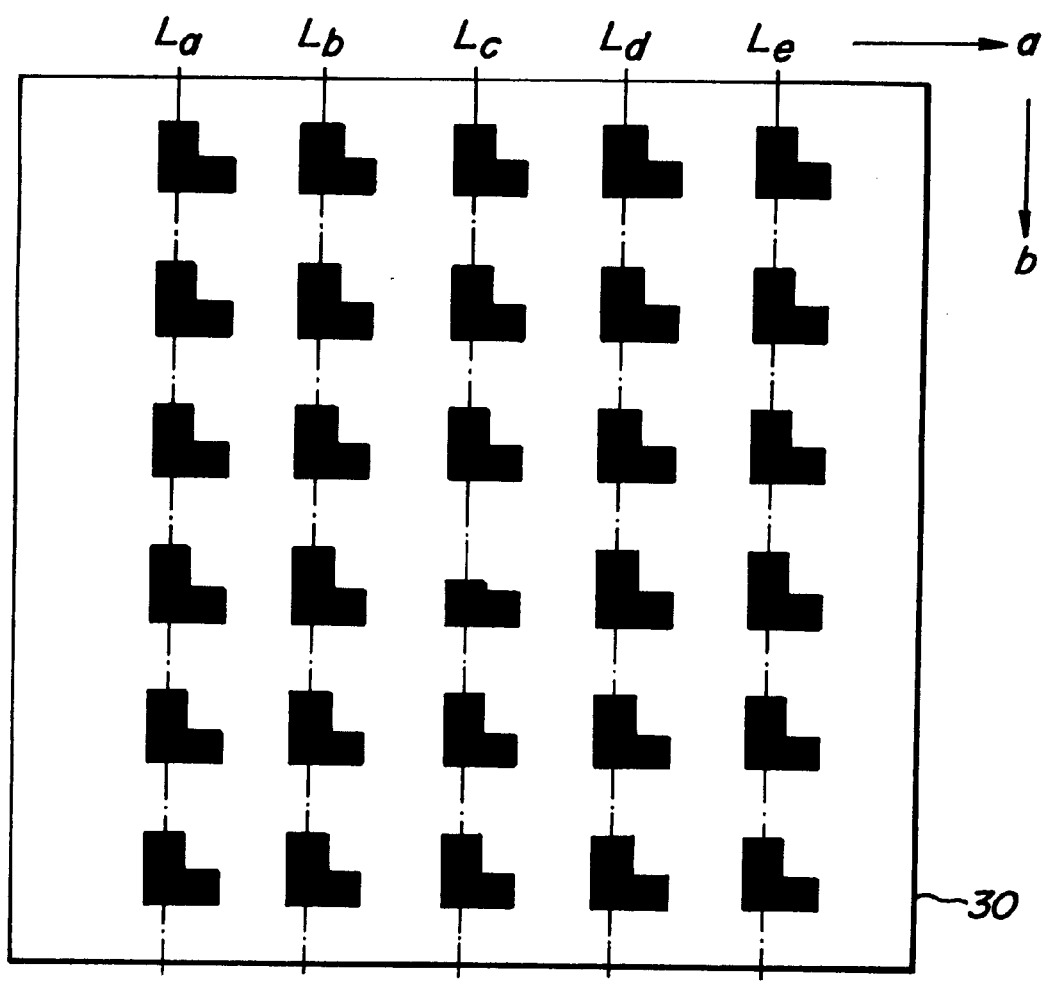
FIG_6

LASER MICROSCOPE AND A PATTERN INSPECTION APPARATUS USING SUCH LASER MICROSCOPE

BACKGROUND OF THE INVENTION

1. Field of the Invention

The present invention relates to a laser microscope for scanning a specimen under inspection with laser light.

The present invention also relates to a pattern checking apparatus using a laser microscope, and more particularly to a pattern checking apparatus, in which a periodically formed pattern can be checked at a high speed. It should be noted that in the present specification, the term laser microscope means a microscope in which laser light emitted by a laser light source is projected onto a specimen, light reflected by the specimen or transmitted through the specimen is received by a photo-detector by means of a pin hole or a frame defining an aperture of a light receiving area, and an image of the specimen is formed by processing an output signal from the photo-detector. Further, a term confocal optical system means an optical system in which a light beam emitted from a point-like light source is projected onto a specimen as a light spot and light reflected by the specimen or transmitted through the specimen is received by a photo-detector by means of a pin hole.

2. Statement of the Related Art

There has been known to check or detect a defect in a substance having a plurality of patterns such as LSI, wafer with a pattern and photomask, by illuminating a whole surface of the substance with illumination light in a two-dimensional manner and light reflected by the specimen is received by a two dimensional CCD array. In this known defect detecting apparatus, a whole surface of the substance to be checked is illuminated, an image of the substance is picked-up by the two-dimensional CCD array, and output signals from respective light receiving elements of two-dimensional CCD array are read out in a serial manner by means of a transfer circuit, and a defect is detected from the thus read out output signals.

There has been also known to detect defects by utilizing a laser microscope. Such a laser microscope has been known from, for instance U.S. Pat. No. specification 4,736,110. In case of detecting defects by using the laser microscope, a light source is formed by a laser diode, laser light is deflected two-dimensionally by means of two beam deflecting devices such as vibrating mirror, light reflected by a specimen is received by a photodetector such as a photo-multiplier, and defects are detected on the basis of an output signal from the photo-multiplier. In order to perform a high speed scanning, it has been also known to use an acoustic-optical deflection element and a vibrating mirror. Since the above mentioned laser microscopes constitute the confocal optical system, it is possible to attain a high resolution, and therefore the laser microscopes are particularly suitable for detecting defects of a specimen having fine patterns such as LSI.

In the above mentioned defect detecting apparatus, in which a two-dimensional image of the specimen is picked-up by means of the two-dimensional CCD array and defects are detected from output signals of respective light receiving elements of the CCD array, the output signals from a number of light receiving elements of the CCD are read out in a serial manner, and therefore a relatively long time is required for reading out the CCD array and thus a defect detection requires a long time. In case of the laser microscope using two vibrating mirrors, a longer time is required for scanning a whole surface of a specimen, and therefore a longer time is required for performing the defect detection. In the laser microscope using a combination of an acoustic-optical deflection element and a vibrating mirror, a high speed scanning can be effected, and thus a whole specimen can be checked within a relatively short time. However, the high speed scanning is limited by a fact that only one laser beam is used. Moreover, in order to drive the acoustic-optical element, a circuit for generating a high frequency electric signal is required and not only the construction of the microscope becomes complicated but also a manufacturing cost becomes high.

SUMMARY OF THE INVENTION

The present invention has for its object to provide a laser microscope which can scan a specimen at a high speed, while merits of the confocal optical system can be attained.

It is another object of the invention to provide a pattern defect detecting apparatus using such a laser microscope and defects can be detected at a high speed. According to the invention, a pattern to be checked may be LSI, photomask and wafer with patterns.

According to the invention, a laser microscope comprises a light source means for emitting a plurality of light beams aligned in a first direction; an objective lens for projecting said plurality of light beams onto a specimen under inspection to form an array of fine light spots on the specimen; a specimen stage for supporting the specimen under inspection; a stage driving mechanism for moving said specimen stage in a second direction which is perpendicular to said first direction; and a linear image sensor having a plurality of light receiving elements arranged in a direction corresponding to a direction in which said plurality of light spots on the specimen are aligned; whereby light beams reflected by the specimen are made incident upon corresponding light receiving elements of said linear image sensor.

According to the invention, a specimen is illuminated by a multiple spot illumination. It has been known to convert a light beam emitted by a laser light source into a rectilinear light beam by means of a cylindrical lens and the rectilinear light beam is scanned in a direction perpendicular to a direction in which the rectilinear light beam extends to perform the two-dimensional illumination. However, such a rectilinear light beam has various drawbacks. For instance, when a speckle pattern is generated in the laser beam, it is no more possible to obtain the rectilinear light beam having a uniform intensity distribution, and noise might be generated in an image. Moreover, the illumination light is projected onto an unnecessary portion, and therefore all illumination light could not be used effectively and a loss in light amount might occur. Contrary to this, according to the invention, the multiple spot illumination is performed and light beams from respective light spots formed on the specimen are made incident upon respective light receiving elements of the linear image sensor. Therefore, all illumination light can be utilized effectively.

In a preferable embodiment of the laser microscope according to the invention, there are provided a light source means for emitting a plurality of light beams aligned in a first direction; a beam deflecting means for deflecting these light beams into a second direction perpendicular to the first direction; an objective lens arranged between said beam deflecting means and the specimen under inspection for converging said plurality of deflected light beams and projecting them onto the specimen as a fine light spot array; and a linear image sensor having a plurality of light receiving elements arranged in a direction corresponding to a direction in which said light spot array on the specimen is aligned; whereby the light beams reflected from respective light spots on the specimen under are made incident upon corresponding light receiving elements of said linear image sensor by means of said objective lens and beam deflecting means.

According to the invention, the multiple spot illumination is performed by means of a plurality of light beams and plural portions of the specimen under inspection are scanned simultaneously. To this end, a plurality of light beams emanating from the light source means are deflected by the beam deflecting means into the direction perpendicular to the direction in which the light beams are aligned. The thus deflected light beams are projected onto the specimen by means of the objective lens to scan plural portions of the specimen simultaneously. Light beams reflected by the specimen are collected by the objective lens and are then made incident upon the linear image sensor by means of the beam deflecting means. The linear image sensor includes a plurality of light receiving elements aligned in the direction corresponding to the light spot array on the specimen. Since the light beams impinging upon the linear image sensor pass through the beam deflecting means, the light beams impinging upon respective light receiving elements are remained in a stand still condition, although the light spots are vibrated on the specimen periodically. Therefore, the specimen can be scanned in a two-dimensional manner by means of the only one scanner, and a specimen image can be scanned at a high speed without using a high speed deflecting means such as the acoustic-optical element.

In a preferable embodiment of the laser microscope according to the invention, the light source is formed by a laser light source and a transmission type diffractive grating and a number of light beams are generated simultaneously. It should be noted that according to the invention, the laser light source may be formed by a laser diode array or LED array instead of the above combination of the laser and the diffractive grating.

In a preferable embodiment of the laser microscope according to the invention, the specimen is supported by a specimen stage and the specimen stage is moved in said first direction to scan the specimen by means of a plurality of light beams. In this case, if there is formed a large space between adjacent light spots formed on the specimen, a reproduced image contain vacant portions. In such a case, a whole surface of the specimen could be scanned without fail by moving the specimen stage along a direction in which the light beams are aligned.

In a preferable embodiment of the laser microscope according to the invention, a beam splitting means is arranged on an optical path between said light source means and said objective lens for separating the light beams emanating from the light source means to the objective lens from the light beams emanating from the objective lens to the linear image sensor. This beam splitting means may be formed by a polarizing beam splitter.

In a preferable embodiment of the laser microscope according to the invention, a relay lens composed of a zoom lens is arranged on an optical path between the beam splitting means and the linear image sensor such that the light beams emanating from the light spots on the specimen are made incident upon corresponding light receiving elements of the linear image sensor. Upon designing the optical system of the microscope, the optical system is designed such that the light beams from the specimen can be made incident upon corresponding light receiving elements of the linear image sensor. However, in practice, characteristics of the optical elements might deviate from desired values and a pitch of light beams emanating from the specimen might deviate from a reference value. Then, the light beams could not be correctly made incident upon the light receiving elements. In such a case, by adjusting a magnification of the zoom lens of the relay lens, the light beams emanating from the specimen can be positively made incident upon respective light receiving elements of the linear image sensor.

In a preferable embodiment of the laser microscope according to the invention, a zoom lens is arranged on an optical path between the light source means and the beam splitting means, and light spots aligned with a desired pitch can be formed on the specimen by adjusting the zoom lens. In this embodiment, a pitch of the light spots on the specimen can be set to a desired one in accordance with characteristics of the specimen by means of the zoom lens.

According to the invention, a pattern checking apparatus for checking defects of a plurality of patterns which are formed periodically with a constant pitch on a substance to be checked, comprises a light source means for emitting a plurality of light beams aligned in a first direction; a beam deflecting means for deflecting said plurality of light beams in a second direction perpendicular to said first direction; an objective lens for projecting said plurality of light beams onto a substance to be checked to form an array of fine light spots; a stage for supporting the substance to be checked; a linear image sensor having a plurality of light receiving elements arranged in a direction corresponding to the direction in which said plurality of light spots on the substance to be checked are aligned and generating output signals from respective light receiving elements in parallel with each other; a beam deflection control circuit for controlling the operation of said beam deflecting means; and a comparison circuit for comparing output signals from the light receiving elements of the linear image sensor to generate a defect signal; whereby light beams reflected by the substance to be checked are made incident upon corresponding light receiving elements of said linear image sensor by means of the objective lens and beam deflecting means and a defect of the patterns is detected by comparing output signals from at least two light receiving elements. For instance, a number of identical patterns are formed periodically at a given pitch on a wafer of LSI. In such a case, the wafer is scanned with a number of light beams simultaneously, said light beams being formed at a pitch which is equal to the pattern pitch or to an integer multiple of the pattern pitch or to an inverse of an integer multiple of the pattern pitch. Then, a checking time can be shortened materially. Furthermore, when no deflect is existent, the output signals from the light receiving elements of the linear image sensor become identical with each other, and thus defects in the patterns can be detected by comparing these output signals with each other. This results in that a defect detection signal may be generated by comparing the output signals from the light receiving elements without converting them into digital signals, and therefore a checking time can be further shortened to a great extent.

In a preferable embodiment of the pattern defect checking apparatus according to the invention, the linear image sensor is formed by a photodiode array having a plurality of photodiodes which are aligned in a rectilinear manner and produce output signals in a parallel mode. As the linear image sensor, there have been proposed a serial output type in which output signals is generated in a serial manner by means of a transfer circuit and a parallel output type in which output signals are produced in a parallel manner without using a transfer circuit. When the linear image sensor is utilized as the photo-detector in the laser microscope, it is necessary to form a video signal from the output signals produced by the photo-detector, and therefore it is necessary to read the output signals in a serial manner from the linear image sensor. Contrary to this, when the linear image sensor is utilized as the photo-detector in the defect checking apparatus, the outputs may be generated in a parallel manner from the linear image sensor, because in this case, it is not necessary to produce the video signal. When the outputs signals are read out in a parallel manner from the linear image sensor, these output signals can be directly supplied to the comparison circuit without being temporally stored in a memory and the checking time can be reduced largely.

A pitch of the light spots formed on the substance to be checked may be equal to a pitch of patterns of the substance to be checked or to an integer multiple of the pattern pitch or to an inverse of an integer multiple of the pattern pitch. For instance, when a pitch of patterns to be checked is small, a pitch of the light spots to be formed on the substance to be checked is set to an integer multiple of the pattern pitch, and when the pattern pitch is large, the pitch of the light spots is set to an inverse of an integer multiple of the pattern pitch.

In a preferable embodiment of the pattern checking apparatus according to the invention, a relay lens is arranged on an optical path which is common to an optical path from the light source means to the objective lens and an optical path from the objective lens to the linear image sensor, and said relay lens is formed by a zoom lens. Then, by simply adjusting a magnification of the zoom lens, a pitch of the light spots can be adjusted to correspond correctly to the pattern pitch of the substance to be checked. In this case, the optical system has to be designed such that even if a magnification of the zoom lens is changed, the light beams from the substance to be checked can be correctly made incident upon corresponding light receiving elements of the linear image sensor. It should be noted that when the relay lens arranged in an optical path between the beam splitting means and the linear image sensor is constituted by the zoom lens, the light beams emanating from the light spots on the substance to be checked can be positively made incident upon corresponding light receiving elements of the linear image sensor although characteristics of the optical system deviate slightly.

According to the invention, the pattern checking apparatus for checking defects of a pattern which includes a plurality of first patterns formed periodically at a given pitch and each of the first patterns is composed of a plurality of sub-patterns, comprises a light source means for emitting a light beam; a diffraction grating for converting said light beam into a plurality of sub-beams which are aligned in a first direction; a beam deflecting means for deflecting said plurality of sub-beams in a second direction perpendicular to the first direction; a first beam splitting element for dividing said sub-beams emanating from the beam deflecting means into first and second sub-beam groups; first and second objective lenses each arranged on optical paths of said first and second sub-beam groups, respectively for projecting said plurality of sub-beams onto a substance to be checked to form light spot arrays on the substance; first and second linear image sensors each having a plurality of light receiving elements aligned in a direction corresponding to a direction in which said light spot array on the substance extends; a second beam splitting element arranged on an optical path between said beam deflecting means and said first and second linear image sensors for dividing said first and second sub-beam groups from each other; a beam deflection control circuit for controlling the operation of said beam deflecting means; and a comparison circuit for comparing output signals from respective light receiving elements of the linear image sensors; whereby light beams reflected from respective light spots on the substance to be checked are made incident upon said second beam splitting element by means of said first and second objective lenses, first beam splitting element and beam deflecting means, the first and second sub-beam groups are divided from each other by the second beam splitting element, the sub-beams of the first sub-beam group are made incident upon respective light receiving elements of the first linear image sensor, the sub-beams of the second sub-beam group are made incident upon respective light receiving elements of the second linear image sensor, and a pattern defect is detected by comparing output signals from corresponding light receiving elements of the first and second linear image sensors. By constructing the apparatus in this manner, a plurality of areas of the substance can be simultaneously checked by means of a plurality of sub-beam groups each having the same number of sub-beams, and therefore a time required for checking the patterns on the substance can be shortened to an extremely large extent.

BRIEF DESCRIPTION OF THE DRAWINGS

FIG. 5 is a schematic view depicting the pattern checking apparatus according to the invention;

FIG. 6 is a schematic view representing an arrangement of patterns on a substance to be checked and a scanning condition of light beams;

DESCRIPTION OF THE PREFERRED EMBODIMENTS

Figure 1:
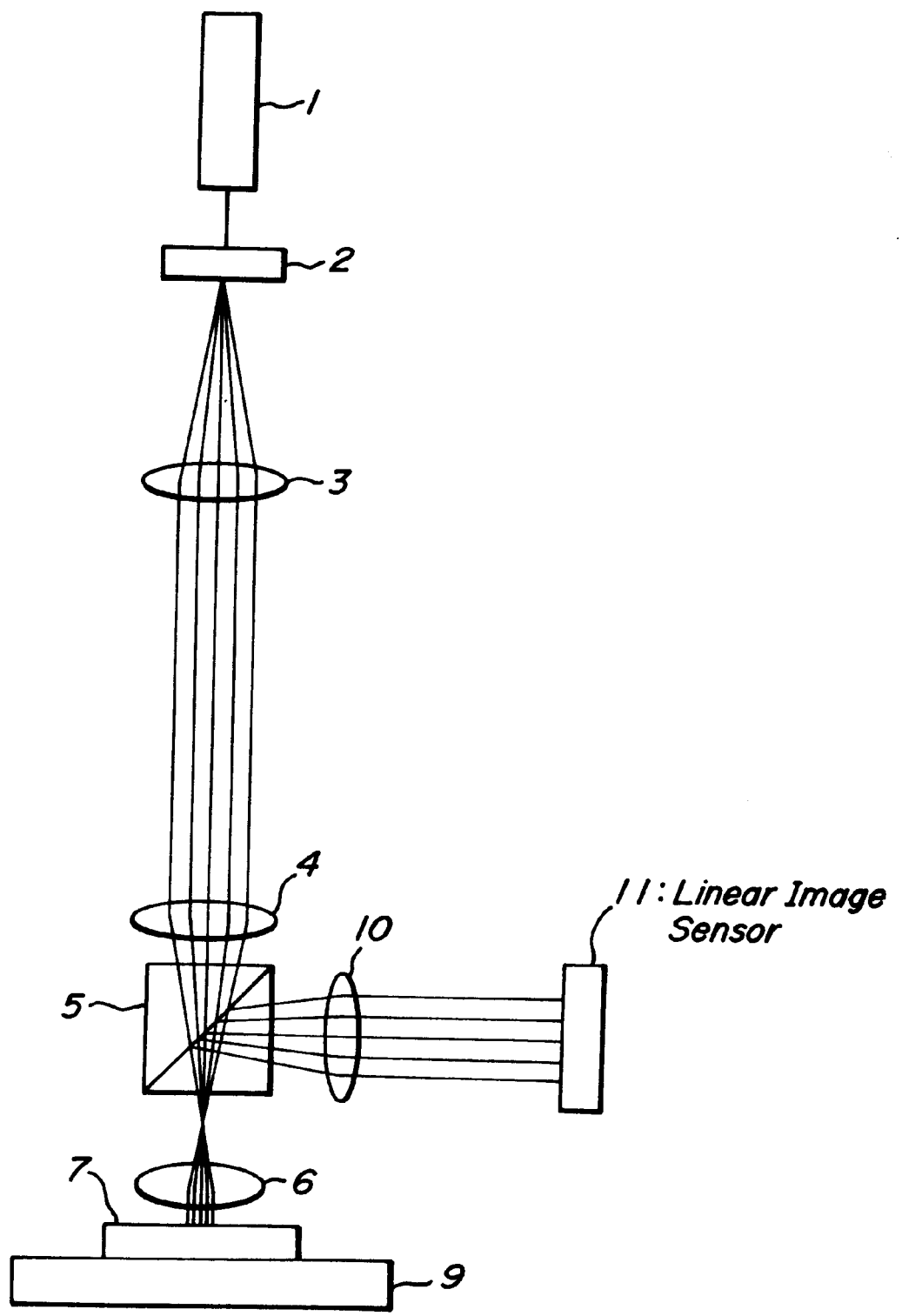
FIG. 1 is a schematic view showing an embodiment of the laser microscope according to the invention.
Figure 2A:
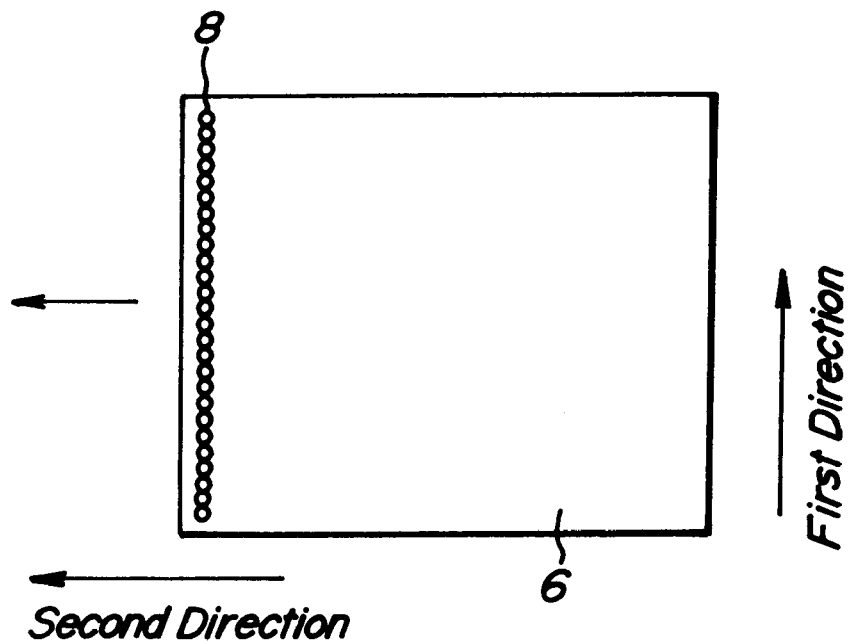
FIG. 2 is a schematic view illustrating a condition of light spots formed on a specimen and a condition of light spots formed on a linear image sensor.

FIG. 1 is a schematic view showing an embodiment of the laser microscope according to the invention. In the present embodiment, a combination of a laser and a diffraction grating is used as the light source means for emitting a plurality of light beams. A laser beam emitted by a laser 1 is made incident upon a transmission type diffraction grating 2 to generate a plurality of light beams which are aligned in a first direction on a plane of the drawing. In the drawing, there are shown five light beams, but it is a matter of course that any desired number of light beams may be generated. It should be noted that the diffraction grating 2 is arranged at a position which is conjugate with a pupil of an objective lens to be explained later. The light beams emanating from the diffraction grating 2 are made incident upon an objective lens 6 by means of first and second relay lenses 3 and 4 and a beam splitter 5. The objective lens 6 projects the incident light beams onto a specimen 7 under inspection as fine light spots. Therefore, an array of fine light spots 8 is formed on the specimen 7 along a line which extends in a direction corresponding to the first direction. This condition is shown in FIG. 2(A).

The specimen 7 is placed on an XY stage 9 having a driving mechanism for moving the stage in the first direction, i.e. the direction of the light spot array as well as in the second direction perpendicular to the first direction. When the stage 9 moves in the direction perpendicular to the first direction (in FIG. 1, the direction perpendicular to the plane of the drawing, and in FIG. 2 the direction denoted by an arrow), the specimen 6 is scanned two-dimensionally by means of a plurality of light beams.

Figure 2B:
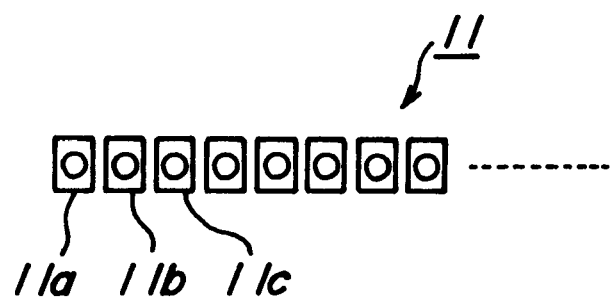

Light beams reflected from a plurality of light spots formed on the specimen 7 are collected by the objective lens 6, are reflected by the beam splitter 5, and then are made incident upon a linear image sensor 11 by means of a relay lens 10. The linear image sensor 11 comprises a plurality of light receiving elements 11a, 11b, 11c—arranged in a rectilinear manner along a direction corresponding to the direction in which the light spots are formed on the specimen 7. In the present invention, the light beams reflected from the respective light spots formed on the specimen 7 are made incident upon corresponding light receiving elements 11a, 11b, 11c—of the linear image sensor. This condition is schematically shown in FIG. 2(B). In order to make the light beams reflected from the light spots on the specimen correctly incident upon the respective light receiving elements of the linear image sensor, a relay lens arranged in an optical path between the specimen to the linear image sensor may be formed by a zoom lens. By adjusting a magnification of the zoom lens, it is possible to impinge the light beams reflected from the specimen upon corresponding light receiving elements of the linear image sensor 11.

Figure 3:
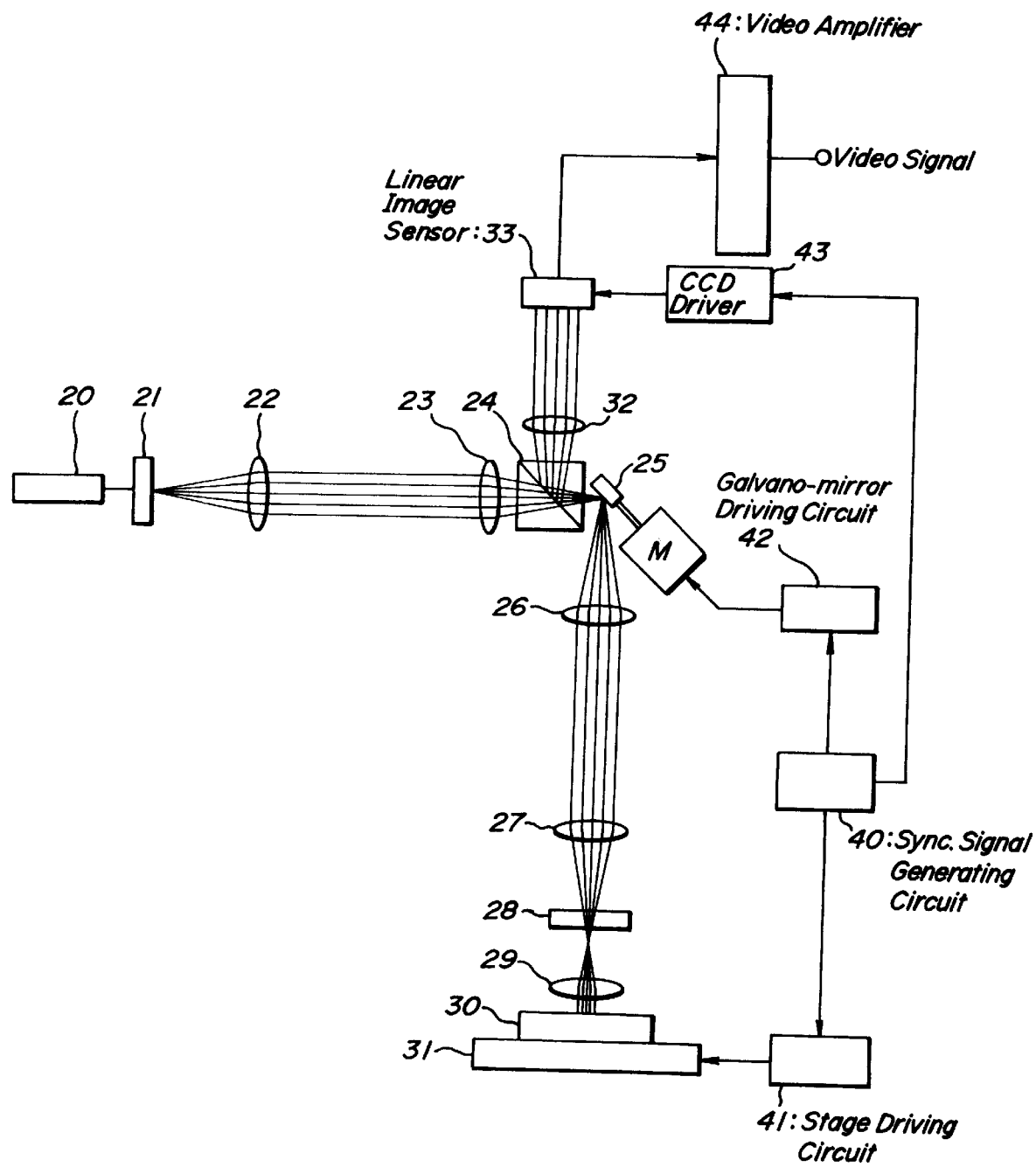
FIG. 3 is a schematic view depicting an embodiment of the pattern checking apparatus according to the invention, in which another embodiment of the laser microscope according to the invention is used.

FIG. 3 is a schematic view illustrating an embodiment of the laser microscope according to the invention. A laser beam emitted by a laser light source 20 is made incident upon a diffraction grating 21 and is converted into a plurality of light beams which are aligned in a first direction in an equidistant manner. In order to simplify the drawing, the light beams are shown to be diffracted in the plane of the drawing. These light beams are made incident upon a polarizing beam splitter 24 by means of relay lenses 22 and 23, are transmitted through the polarizing beam splitter 24, and are made incident upon a galvano-mirror 25. The galvano-mirror 25 deflects the incident light beams periodically at a given frequency in a second direction (perpendicular to the plane of the drawing) perpendicular to the first direction. A plurality of light beams reflected by the galvano-mirror 25 are made incident upon an objective lens 29 by means of third and fourth relay lenses 26 and 27 and a quarter wavelength plate 28. The objective lens 28 converges the incident light beams into fine light spots and projects these light spots onto a specimen 30 under inspection. Then, a plurality of fine light spots are formed equidistantly along a line extending in a direction corresponding to the first direction. Since these light spots are deflected by the galvano-mirror 25 in the second direction perpendicular to the direction in which the light spots are aligned, the specimen 30 is scanned with a plurality of light beams which are aligned equidistantly. In this manner, the specimen can be scanned two-dimensionally.

The specimen 30 is placed on a stage 31 having an XY driving mechanism. Light beams reflected from the light spots on the specimen are converged by the objective lens 29 and are made incident upon the galvano-mirror 25 by means of the quarter wavelength plate 28 and relay lenses 27 and 26. These light beams are de-scanned by the galvano-mirror 25 and are made incident upon the polarizing beam splitter 24. Since the incident light beams have been transmitted through the quarter wavelength plate 28 twice, a polarizing plane has been rotated by 90°, and thus the light beams emanating from the specimen are reflected by a polarizing plane of the polarizing beam splitter 24 and are separated from the illumination light beams emitted from the light source. The light beams emanating from the polarizing beam splitter 25 are made incident upon a linear image sensor 33 by means of a relay lens 32. The linear image sensor 33 includes a plurality of light receiving elements arranged in a rectilinear manner along a line corresponding to the direction in which the light spots are aligned on the specimen.

The reflected light beams from the light spots on the specimen 30 are de-scanned by the galvano-mirror 25, and thus the light beams from respective light spots on the specimen are made incident upon corresponding light receiving elements of the linear image sensor 33 and are remained to be stationary on the linear image sensor. Therefore, by reading the linear image sensor 33 at a given frequency, it is possible to obtain a two-dimensional video signal of the specimen 30. It should be noted that by moving the stage 31 in the first direction, i.e. the direction in which the light spots are aligned, it is possible to pickup a whole image of the specimen.

Next, a manner of setting a distance between successive light beams emitted by the light source device will be explained. A distance between successive light beams emitted by the light source device is determined by a condition of the diffraction grating to be used. It is sometimes desired to adjust at will the light beam distance in accordance with characteristics of a specimen under inspection. Particularly, when a specimen under inspection has a periodicity, it is desired to inspect the specimen such that the light beam distance is set to be identical with the periodicity. In order to satisfy such a requirement, one of relay lenses arranged on an optical path between the light source means and the specimen is constituted by a zoom lens. By suitably adjusting a magnification of the zoom lens, a distance between successive light spots formed on the specimen can be set to a desired pitch. The zoom lens is preferably arranged on an optical path between the galvano-mirror 25 and the objective lens 28, and in the present embodiment the relay lens 26 is formed by a zoom lens.

The optical system is designed such that a plurality of light beams reflected by the specimen 30 are made incident upon corresponding light receiving elements of the linear image sensor 33, but characteristics of the optical elements might deviate from reference values and the light beams from the specimen might not be correctly made incident upon corresponding light receiving elements of the linear image sensor. In order to remove such a drawback, a relay lens arranged on an optical path between the beam splitter 24 and the linear image sensor 33 may be formed by a zoom lens. In the present embodiment, the relay lens 32 is formed by a zoom lens. By adjusting a magnification of the zoom lens, the light beams from the specimen can be positively made incident upon corresponding desired light receiving elements of the linear image sensor.

Next, driving control for the laser microscope will be explained. The driving control for the laser microscope is performed by synchronizing signals supplied by a synchronizing signal generating circuit 40. A synchronizing signal from the synchronizing signal generating circuit 40 is supplied to a stage driving circuit 41 to move the stage 31 in the second direction (perpendicular to the plane of the drawing). A synchronizing signal is supplied from the synchronizing signal generating circuit 40 to a galvano-mirror driving circuit 42 to control the galvano-mirror 25. Moreover, a synchronizing signal is supplied to a CCD driver 43 to read out electric charges stored in respective light receiving elements of the linear image sensor 33 line by line, and readout output signals are successively supplied to a video amplifier 44 to generate a video signal. In this case, the linear image sensor 33 is readout successively while the stage 31 is moved in the direction perpendicular to the direction in which the light spots are aligned.

Figure 4A:
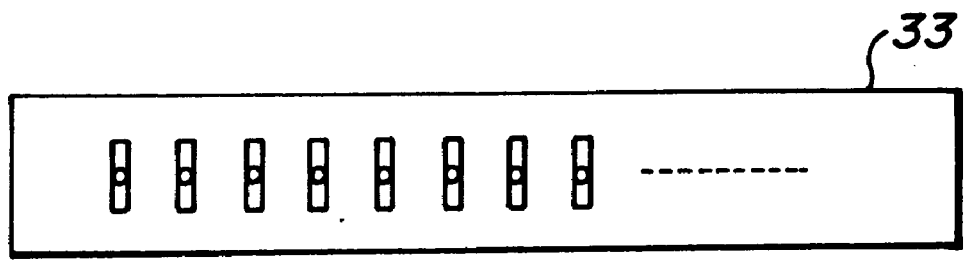
FIG. 4 is schematic plan view showing linear image sensors having an improved confocality.
Figure 4B:
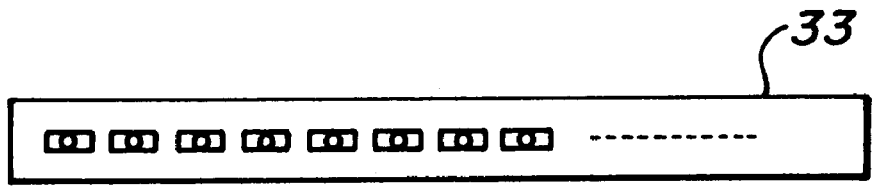

Now a method of improving the confocality of the laser microscope will be explained. In order to construct the confocal optical system, the light beams reflected from the light spots on the specimen have to be made incident upon light receiving areas of respective light receiving elements of the linear image sensor as focused light spots such that flare light can be removed. To this end, the linear image sensor may be constructed as shown in FIGS. 4(A) and 4(B). In FIGS. 4(A) and 4(B), a vacant circle denotes a light spot formed on the linear image sensor. FIG. 4(A) illustrates an example, in which the confocality in the direction in which the light receiving elements are aligned is improved by forming a light detecting area to be elongated in the direction perpendicular to the direction along which the light receiving elements are aligned. FIG. 4(B) shows an example, in which a confocality in the direction perpendicular to the light receiving element aligning direction is enhanced by forming a light detecting area to be elongated in the direction in which the light receiving elements are aligned. When the beam deflecting device is formed by a polygonal mirror, the light beams could not be de-scanned accurately and the light spots formed on the linear image sensor might fluctuate slightly in a periodic manner in a direction perpendicular to the direction in which the light receiving elements are aligned. In such a case, the fluctuation of the light spots can be sufficiently compensated for by using the light detecting area which extends in the direction perpendicular to the element aligning direction as shown in FIG. 4(B).

Next, a pattern checking apparatus using the laser microscope shown in FIG. 3 will be explained. This pattern checking apparatus is illustrated in FIG. 5. It should be noted that the pattern checking apparatus of the present embodiment has a substantially same structure as the laser microscope depicted in FIG. 3 and only a defect checking circuit is different. Therefore, portions similar to those shown in FIG. 3 are denoted by the same reference numerals used in FIG. 3 and their detailed explanation is dispensed with. In the present embodiment, a substance to be checked has a plurality of patterns in a periodic manner as shown in FIG. 6. In FIG. 6, the patterns are arranged in five rows and six columns, but in practice, a larger number of patterns are formed. In FIG. 6, the light spots are formed on the substance 30 to be checked in a direction shown by an arrow a, the galvano-mirror 25 scans the light beams in a direction indicated by an arrow b, and scanning lines by the light beams are denoted by chain lines.

Upon checking the pattern, a pitch of the light spots formed on the substance 30 to be checked is set to be equal to the pattern pitch or an integer multiple of the pattern pitch or an inverse of an integer multiple of the pattern pitch. In FIG. 6, a pitch of the light spots are set to be identical with the pattern pitch. A pitch of the light spots can be adjusted by adjusting the third relay lens 26 formed by the zoom lens. The light beams deflected by the galvano-mirror 25 and having the adjusted pitch are made incident upon the substance 30 to be checked by means of the fourth relay lens 27, quarter wavelength plate 28 and objective lens 28. Therefore, the substance 30 is scanned with a plurality of light beams having a pitch equal to a pitch of the patterns to be checked.

The light beams emanating from the substance 30 to be checked propagate in a reverse direction along the same optical path, are de-scanned by the galvano-mirror 25, and are made incident upon corresponding light receiving elements of the linear image sensor 33.

In the present embodiment, the linear image sensor 33 is formed by a plurality of photodiodes arranged in a rectilinear manner, and a plurality of output signals are produced in a parallel mode. In case of checking defects in patterns, it is not necessary to pickup an image like in the laser microscope, and therefore the output signals of respective light receiving elements are not read out successively, but are read out in a parallel manner. The output signals from the photodiodes, i.e. light receiving elements are supplied to current-voltage converting amplifiers 45a–45e and are converted into voltage signals which are them applied to a comparison circuit 46. In the comparison circuit 46, the output signals from respective light receiving elements are compared with each other. In the present embodiment, output signals from adjacent light receiving elements are compared with each other to generate a defect detection signal. The comparison circuit 46 includes a plurality of comparators whose number corresponds to the number of the light beams, and output signals from a number of light receiving elements can be simultaneously compared with each other. In the comparing circuit 46, not only two output signals from adjacent light receiving elements, but output signals from every other light receiving elements or every second light receiving elements may be compared with each other.

Figure 7:
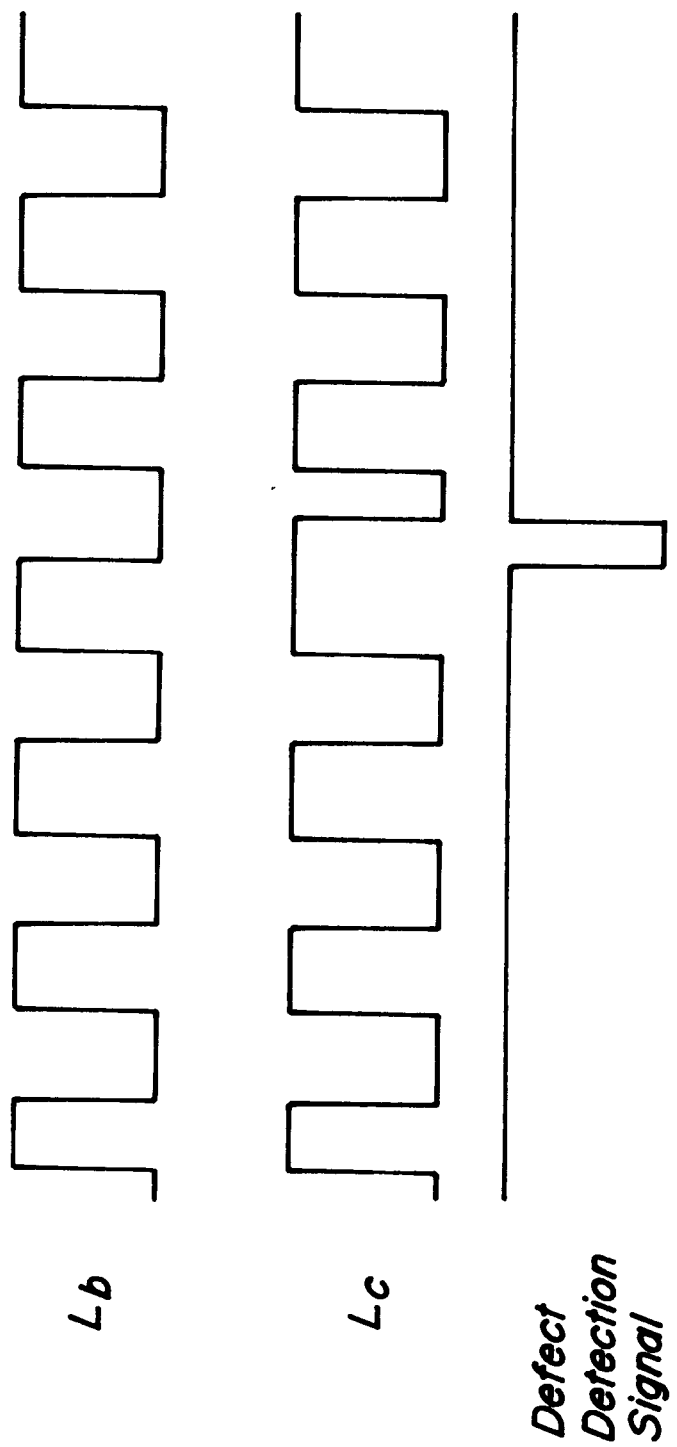
FIG. 7 is a schematic view illustrating output signals from light receiving elements and a defect detection signal.

Now it is assumed that a part of a fourth pattern on the pattern arrangement line $L_c$ is removed as shown in FIG. 6. FIG. 7 illustrates video signals of the lines $L_b$ and $L_c$ and a defect detection signal. On the line $L_b$, there is produced the periodic video signal having no defect. However, on the line $L_c$, since the fourth pattern has a defect, an abnormal signal is produced at a corresponding portion. Therefore, the comparison circuit 46 produces the defect detection signal, and the defect is detected. In this manner, the defect detection can be conducted on a real time in synchronism with the scanning of the substance to be checked and a time required for checking can be reduced to a large extent. Particularly, since a number of light beams can be used, the defect checking can be carried out for a number of pattern rows simultaneously, and therefore the checking speed can be further improved. In the present embodiment, the output signals from the light receiving elements of the linear image sensor are treated in a parallel manner, the processing speed can be increased materially.

When there are spaces between successive light beams, that is to say when there are spaces between successive light spots formed on the substance to be checked, there are portions which are not scanned. In such a case, a whole surface of the substance to be checked can be scanned without producing an overlap of light spots by moving the substance to be checked in the direction in which the light spots are aligned at a speed defined by the following equation:

$$V = AN/T$$

wherein the number of light beams: N beam distance: P image size: A scanning period: T stage moving speed: V the number of beams N=nP/A±1 (n is a positive integer).

Figure 8:
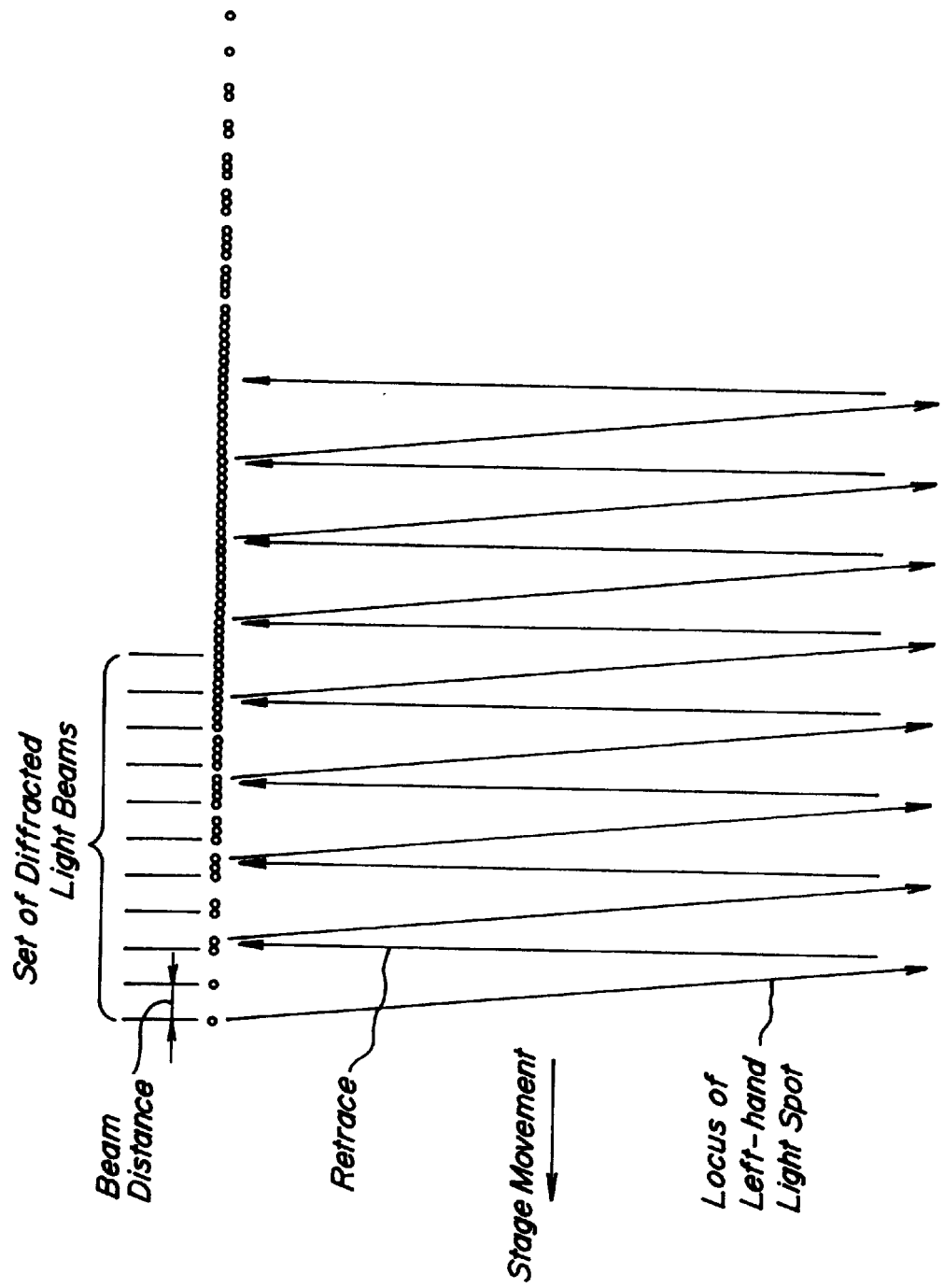
FIG. 8 is a schematic view expressing a positional relationship between patterns on a substance to be checked and scanning light spots.

FIG. 8 illustrates an example in which the scanning is performed under a condition that the number of beam is set to eleven and beam distance/image size=5. As shown in FIG. 8, by setting the stage moving speed V in accordance with the above equation, a whole surface of the substance to be checked can be scanned without causing an overlap of light spots except for an accelerating period at a start of the scan.

Figure 9:
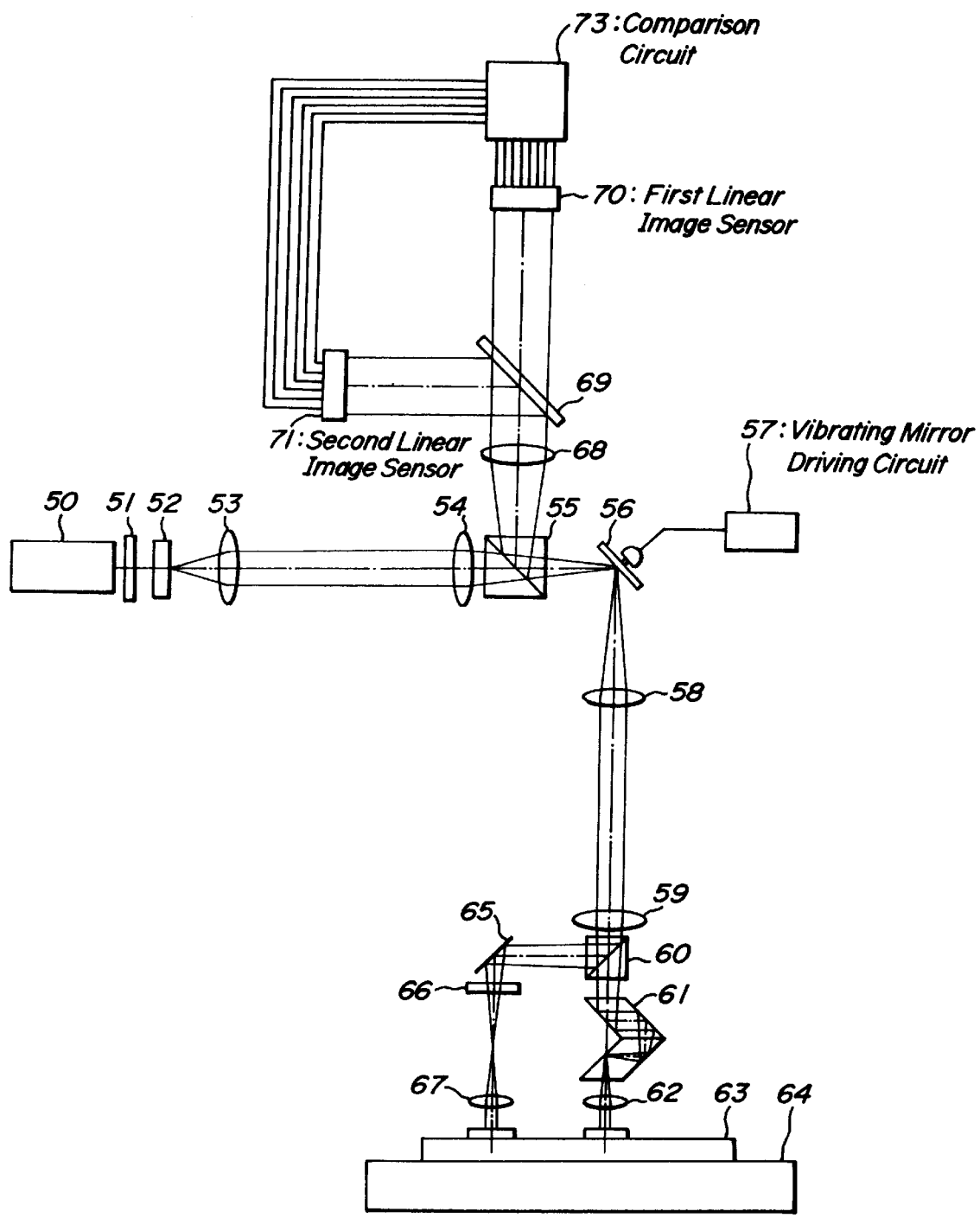
FIG. 9 is a schematic view showing a modified embodiment of the pattern checking apparatus according to the invention.

FIG. 9 is a schematic view showing a modified embodiment of the pattern checking apparatus according to the invention. In the present embodiment, the pattern checking apparatus can be advantageously used for checking defects in patterns which are irregularly formed on a substance to be checked. For instance, in a chip for a logic circuit on a wafer, a regular pattern for a memory is formed in a central portion of the chip and an irregular pattern for a control circuit is formed in a peripheral portion. Therefore, the wafer having such an irregular pattern could not be effectively checked by the pattern checking apparatus of the previous embodiment. In the pattern checking apparatus according to the invention, first and second light beam groups each including a plurality of light beams formed from a same light beam are used, and a defect is detected by comparing corresponding light beams of these light beam groups.

A laser beam emitted by a laser light source 50 is converted into a circularly polarized light beam by a quarter wavelength plate 51, and the circularly polarized light beam is made incident upon a diffraction grating 52 to produce a plurality of light beams which are aligned in a first direction. These light beams are made incident upon a half beam splitter 55 by means of a first relay lens 53 formed by a zoom lens and a second relay lens 54. Light beams transmitted through the half beam splitter are made incident upon a vibrating mirror 56. The vibrating mirror deflects all the light beams in a periodic manner in a second direction perpendicular to the first direction under a control of a driving signal from a vibrating mirror driving circuit 57. The light beams emanating from the vibrating mirror are made incident upon a first polarizing beam splitter 60 by means of fourth and fifth relay lenses 58 an 59. P-polarized components of the incident light beams are transmitted through the polarizing beam splitter and S-polarized components are reflected by the polarizing beam splitter. The P-polarized light beams are made incident upon a first objective lens 62 by means of a lens position adjusting mechanism 61. The first objective lens 62 converges the incident P-polarized light beams and forms a plurality of light spots on a wafer 63 on which a number of chips are formed regularly, said light spots being aligned in a direction corresponding to said first direction. The wafer whose patterns are to be checked is placed on an XY stage 64. A plurality of S-polarized light beams reflected by the polarizing beam splitter 60 are made incident upon a quarter wavelength plate 66 by means of a reflection mirror 65 and are converted into P-polarized light beams, which are then made incident upon a second objective lens 67. In this case, by suitably adjusting a direction of an optic axis of the quarter wavelength plate 66, the P-polarized light beams can be made incident upon the objective lens. The second objective lens 67 converges these light beams and forms a plurality of light spots on the wafer 63 like as the first objective lens, said light spots being aligned in a direction corresponding to the first direction. It should be noted that by suitably constructing a polarizing film of the polarizing beam splitter 60, the P-polarized light beams and S-polarized light beams may have a same intensity.

A distance between the first and second objective lenses 62 and 67 is set to be identical with a pitch at which the chips are formed on the wafer to be checked by means of the lens position adjusting mechanism 61. In this manner, adjacent two chips can be scanned simultaneously with plurality of light beams.

Light beams reflected from a plurality of light spots formed by the first objective lens 62 are collected by the first objective lens and are made incident upon the first polarizing beam splitter 60 by means of the lens position adjusting mechanism 61. Light beams reflected from a plurality of light spots formed by the second objective lens 67 are collected by the second objective lens 67, are converted into S-polarized light beams by means of the half wavelength plate 66, and said S-polarized light beams are made incident upon the polarizing beam splitter 60 by means of the reflection mirror 65. These P-polarized light beams and S-polarized light beams are composed by the polarizing beam splitter 60, are made incident upon the vibrating mirror 56 by means of the fourth and third relay lenses 59 and 58, and are made incident upon the half beam splitter 55 after being de-scanned and are separated from the illumination light beams. The thus separated light beams are then made incident upon a second polarizing beam splitter 69 by means of a fifth relay lens 68 formed by a zoom lens. The P-polarized light beams collected by the first objective lens 62 are transmitted through the second polarizing beam splitter, wherein the light beams collected by the second objective lens 67 and converted into the S-polarized light beams by the half wavelength plate 66 are reflected by the second polarizing beam splitter. The P-polarized light beams transmitted through the second polarizing beam splitter are made incident upon corresponding light receiving elements of a first linear image sensor 70, and the reflected S-polarized light beams are made incident upon corresponding light receiving elements of a second linear image sensor 71.

From the first and second linear image sensors 70 and 71, output signals are produced in a parallel mode, and these output signals are supplied to a comparison circuit 72 by means of current-voltage converting amplifiers (not shown). In the comparison circuit 73, output signals from corresponding light receiving elements of the first and second linear image sensors 70 and 71 are compared with each other to generate a defect detection signal. In this manner, defects in irregularly formed patterns on the wafer can be checked at a high speed.

The present invention is not limited to the embodiments explained above, but many alternations and modifications may be conceived by a person skilled in the art within the scope of the invention. For instance, in the above embodiments, the transmission type diffraction grating is used, but a reflection type diffraction grating may be utilized.

What is claimed is:

1. A laser microscope comprising a light source means for emitting a plurality of light beams aligned in a first direction, an objective lens for projecting said plurality of light beams onto a specimen to form an array of fine light spots on the specimen, a specimen stage for supporting the specimen under inspection, a stage driving mechanism for moving said specimen stage in a second direction which is perpendicular to said first direction, and a linear image sensor having a plurality of light receiving elements arranged in a direction corresponding to a direction which said plurality of light spots on the specimens are aligned, whereby light beams reflected by the specimen are made incident upon corresponding light receiving elements of said linear image sensor, wherein said light source means is consisting of a single laser light source and a single diffraction grating.

2. A laser microscope according to claim 1, wherein said stage driving mechanism moves the specimen stage in a direction in which the light spots are aligned as well as in a direction perpendicular to said direction in which the light spots are aligned.

3. A laser microscope according to claim 1, wherein on an optical path between said light source means and said objective lens, is arranged a beam separating means for separating the light beams propagating from the light source means to the objective lens and the light beams propagating from the objective lens to the linear image sensor.

4. A laser microscope according to claim 3, wherein on an optical path between said beam separating means and said linear image sensor, is arrange a relay lens formed by a zoom lens, and the light beams from the specimen can be made incident upon respective light receiving elements of the linear image sensor by adjusting a magnification of said zoom lens.

5. A laser microscope according to claim 3, wherein on an optical path between said beam separating means and said objective lens, is arranged a relay lens formed by a zoom lens, and a pitch with which the light spots on the specimen are aligned can be changed by adjusting a magnification of said zoom lens.

6. A laser microscope according to claim 1, wherein electric charges stored in respective light receiving elements of the linear image sensor are successively read out to generate a video signal.

* * * * *